(12) United States Patent
Gao et al.

(10) Patent No.: US 11,657,291 B2
(45) Date of Patent: May 23, 2023

(54) SPATIO-TEMPORAL EMBEDDINGS

(71) Applicant: Waymo LLC, Mountain View, CA (US)

(72) Inventors: Jiyang Gao, San Jose, CA (US); Zijian Guo, Sunnyvale, CA (US); Congcong Li, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 284 days.

(21) Appl. No.: 17/063,553

(22) Filed: Oct. 5, 2020

(65) Prior Publication Data

US 2021/0103744 A1 Apr. 8, 2021

Related U.S. Application Data

(60) Provisional application No. 62/911,181, filed on Oct. 4, 2019.

(51) Int. Cl.
*G06V 20/58* (2022.01)
*G06N 3/08* (2006.01)
(Continued)

(52) U.S. Cl.
CPC .......... *G06V 20/58* (2022.01); *G06N 3/0454* (2013.01); *G06N 3/08* (2013.01); *G06V 10/757* (2022.01)

(58) Field of Classification Search
CPC ........ G06N 3/0454; G06N 3/08; G06N 3/084; G06V 10/757; G06V 20/58
See application file for complete search history.

(56) References Cited

U.S. PATENT DOCUMENTS

2012/0005134 A1 1/2012 Jaros et al.
2014/0310227 A1 10/2014 Marianetti, II et al.
(Continued)

FOREIGN PATENT DOCUMENTS

KR 1020190082066 7/2019
WO WO 2016/118672 7/2016

OTHER PUBLICATIONS

Alex H. Lang ,"PointPillars: Fast Encoders for Object Detection from Point Clouds,"Jun. 2019, Proceedings of the IEEE/CVF Conference on Computer Vision and Pattern Recognition (CVPR), 2019, pp. 12697-12702.*
(Continued)

*Primary Examiner* — Omar S Ismail
(74) *Attorney, Agent, or Firm* — Fish & Richardson P.C.

(57) ABSTRACT

Methods, systems, and apparatus, including computer programs encoded on computer storage media, for generating a spatio-temporal embedding of a sequence of point clouds. One of the methods includes obtaining a temporal sequence comprising a respective point cloud input corresponding to each of a plurality of time points, each point cloud input comprising point cloud data generated from sensor data captured by one or more sensors of a vehicle at the respective time point; processing each point cloud input using a first neural network to generate a respective spatial embedding that characterizes the point cloud input; and processing the spatial embeddings of the point cloud inputs using a second neural network to generate a spatio-temporal embedding that characterizes the point cloud inputs in the temporal sequence.

20 Claims, 6 Drawing Sheets

(51) Int. Cl.
*G06N 3/04* (2006.01)
*G06V 10/75* (2022.01)

(56) References Cited

U.S. PATENT DOCUMENTS

| | | | |
|---|---|---|---|
| 2017/0039436 A1 | 2/2017 | Chen et al. | |
| 2017/0080561 A1* | 3/2017 | Meier | B25J 9/163 |
| 2019/0138676 A1* | 5/2019 | Akella | G06N 3/008 |
| 2019/0154872 A1* | 5/2019 | Leduc | G06T 7/292 |
| 2019/0209022 A1* | 7/2019 | Sobol | A61B 5/0022 |
| 2019/0303725 A1* | 10/2019 | Gurvich | G06V 10/454 |
| 2020/0271450 A1* | 8/2020 | Gorur Sheshagiri | G06T 7/70 |
| 2020/0380274 A1* | 12/2020 | Shin | G06T 1/20 |
| 2020/0394499 A1* | 12/2020 | Yao | G06N 3/0454 |

OTHER PUBLICATIONS

Junbo Zhanga, "Predicting citywide crowd flows using deep spatio-temporal residual networks," Mar. 19, 2018, Artificial Intelligence 259(2018),pp. 147-155.*

Yin Zhou,"End-to-End Multi-View Fusion for 3D Object Detection in LiDAR Point Clouds," Mar. 19, 2018, 3rd Conference on Robot Learning (CoRL 2019), Osaka, Japan.,pp. 1-7.*

Yangyan Li,"PointCNN: Convolution on X-Transformed Points," Nov. 5, 2018,Computer Vision and Pattern Recognition,pp. 1-8.*

Charles R. Qi,"PointNet: Deep Learning on Point Sets for 3D Classification and Segmentation," Jul. 2017, Proceedings of the IEEE Conference on Computer Vision and Pattern Recognition (CVPR), 2017,pp. 652-659.*

Yin Zhou,"VoxelNet: End-to-End Learning for Point Cloud Based 3D Object Detection," Jun. 2018, Proceedings of the IEEE Conference on Computer Vision and Pattern Recognition (CVPR), 2018,pp. 4490-4497.*

Lang et al., "PointPillars: Fast encoders for object detection from point clouds," Proceedings of the IEEE/CVF Conference on Computer Vision and Pattern Recognition (CVPR), 2019, 9 pages.

Li et al., "PointCNN: Convolution on X-transformed points," Advances in Neural Information Processing Systems, 2018, 1-14 pages.

PCT International Search Report and Written Opinion in International Appln. No. PCT/US2020/054264, dated Feb. 5, 2021, 10 pages.

Qi et al., "Pointnet: Deep learning on point sets for 3d classification and segmentation," Proceedings of the IEEE Conference on Computer Vision and Pattern Recognition, 2017, 9 pages.

Qi et al., "Pointnet++: Deep hierarchical feature learning on point sets in a metric space," Advances in Neural Information Processing Systems, 2017, 1-14 pages.

Zhou et al., "End-to-End Multi-View Fusion for 3D Object Detection in LiDAR Point Clouds," 3rd Conference on Robot Learning, 2019, 1-10 pages.

Zhou et al., "Voxelnet: End-to-end learning for point cloud based 3d object detection," Proceedings of the IEEE Conference on Computer Vision and Pattern Recognition, 2018, 10 pages.

International Preliminary Report on Patentability in International Appln. No. PCT/US2020/054264, dated Apr. 5, 2022, 7 pages.

* cited by examiner

SPATIO-TEMPORAL EMBEDDINGS

CROSS-REFERENCE TO RELATED APPLICATION

This application claims priority to U.S. Provisional Application No. 62/911,181, filed on Oct. 4, 2019. The disclosure of the prior application is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on inputs to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes a system implemented as computer programs on one or more computers in one or more locations that processes a sequence of multiple point clouds using a spatio-temporal neural network to generate a spatio-temporal embedding of the sequence of point clouds. Each point cloud in the sequence of point clouds corresponds to a respective different time point. The system can provide the spatio-temporal embedding of the sequence of point clouds to one or more downstream systems that are configured to receive the spatio-temporal embedding of the sequence of point clouds as input.

For example, the system can be an on-board system of an autonomous or semi-autonomous vehicle. Each point cloud in the sequence of point clouds can represent the environment surrounding the vehicle and be generated from sensor data captured by one or more sensors on-board the vehicle. In this example, the system can provide the spatio-temporal embedding of the sequence of point clouds to one or more downstream systems that are configured to process the spatio-temporal embedding to generate a prediction about the environment surrounding the vehicle.

In some implementations, the spatio-temporal neural network includes i) a first neural network that processes each point cloud in the sequence of point clouds to generate a respective spatial embedding of each point cloud in the sequence of point clouds and ii) a second neural network that processes the spatial embeddings of the point clouds in the sequence of point clouds to generate the spatio-temporal embedding of the sequence of point clouds. As a particular example, the first neural network can include a voxel embedding neural network and a spatial embedding neural network. The voxel embedding neural network can divide the environment represented by a point cloud into a voxel grid and generate a respective embedding of each voxel in the voxel grid. The spatial embedding neural network can process the respective embeddings of the voxels in the voxel grid to generate the spatial embedding of the point cloud.

In this specification, an embedding is an ordered collection of numeric values that represents an input in a particular embedding space. For example, an embedding can be a vector of floating point or other numeric values that has a fixed dimensionality. In this specification, a spatio-temporal embedding is an embedding of an input that encodes both spatial and temporal information of the input. That is, the input can represent multiple locations and multiple time points, and a spatio-temporal embedding of the input can encode information across the multiple locations and multiple time points.

A point cloud is a collection of data points defined by a given coordinate system. For example, in a three-dimensional coordinate system, a point cloud can define the shape of some real or synthetic physical system, where each point in the point cloud is defined by respective coordinates in the coordinate system. In some cases, each point in the point cloud can include additional information, e.g., an intensity. In this specification, a "point cloud" refers to a three-dimensional point cloud.

The subject matter described in this specification can be implemented in particular embodiments so as to realize one or more of the following advantages.

In some implementations, the system described in this specification can provide a machine-learned spatio-temporal embedding of a sequence of point clouds to multiple different downstream systems to perform respective downstream tasks. It is therefore not necessary for each of the downstream systems to generate its own respective embedding, increasing computational and time efficiency of a system, e.g., an on-board system of an autonomous vehicle, that is required to perform all of the multiple tasks. The increased efficiency can be particularly important in time-constrained and/or resource-constrained environments, e.g., when the system is deployed on-board a vehicle.

In some implementations, the system described in this specification can use the spatio-temporal embedding for one or more downstream tasks for which the spatio-temporal embedding neural network was not explicitly trained. For example, the system can train the spatio-temporal embedding neural network using the downstream task of object heatmap prediction, where an object prediction neural network generates an image characterizing predicted locations of surrounding objects. During training, the spatio-temporal embedding neural network generates embeddings that are used by the object prediction neural network, and the parameters of the spatio-temporal embedding neural network are updated using backpropagation based on an error of the object prediction neural network. After training, the spatio-temporal embeddings generated by the spatio-temporal neural network encode spatial and temporal information that can be transferred, without any modification, to a different task, e.g., object type classification. In some implementations, the system trains the spatio-temporal embedding neural network using multiple different downstream tasks so that the spatio-temporal embeddings encode different domains of information. The system can then provide the trained spatio-temporal embeddings to a different downstream task that was not one of the tasks the spatio-temporal neural network was trained on.

Some existing systems encode sequences of elements, e.g., text sequences or audio sequences, using recurrent neural networks such as LSTMs and GRUs. However, sequences of point clouds cannot be embedded into a high-dimensional feature space using these conventional techniques. Raw point cloud data is very high-dimensional, and the task of encoding the information of each point cloud in a sequence of point clouds, each of which can contain millions of points, does not lend itself well to conventional recurrent neural networks. Using the techniques described in this specification, a system can distill the information contained in a sequence of point cloud that each contain millions of points into a single embedding that captures the rich spatial and temporal features of the environment characterized by the sequence of point clouds.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that processes a sequence of point clouds using a spatio-temporal embedding neural network to generate a spatio-temporal embedding of the sequence of point clouds.

Figure 1:
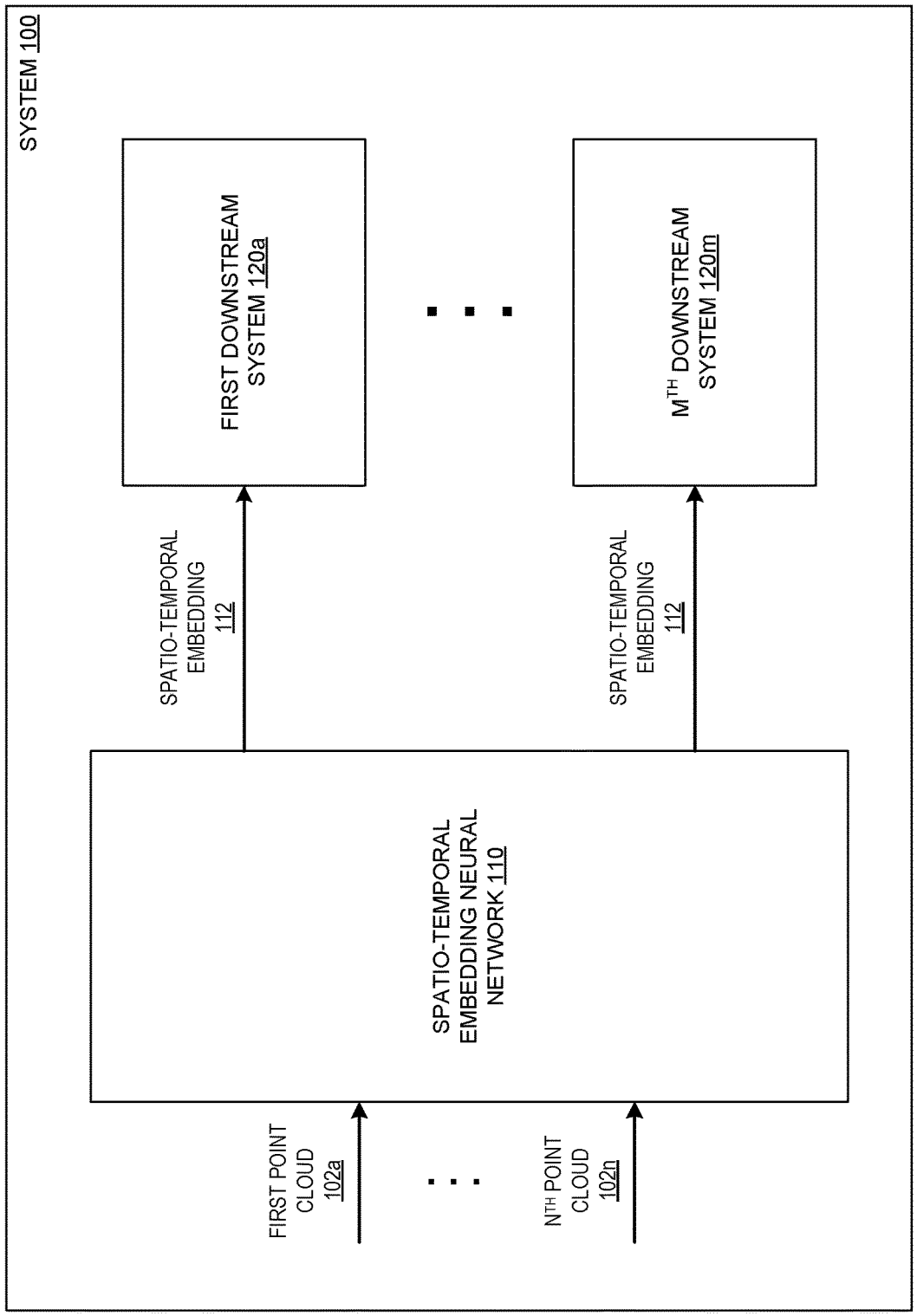
FIG. 1 is a diagram of an example system that includes a spatio-temporal embedding neural network.

FIG. 1 is a diagram of an example system 100 that includes a spatio-temporal embedding neural network 110. The system 100 is an example of a system implemented as computer programs on one or more computers in one or more locations, in which the systems, components, and techniques described below can be implemented.

The spatio-temporal embedding neural network 100 has been configured through training to receive a sequence of point clouds 102a-n and to process the sequence of point clouds 102a-n to generate a spatio-temporal embedding 112 of the sequence of point clouds 102a-n. Each of the point clouds 102a-n can represent the same environment at a respective different time point. For example, each point cloud in the sequence of point clouds 102a-n can be generated from sensor data captured by one or more sensors on-board a vehicle operating in the environment.

In some implementations, the spatio-temporal embedding neural network 110 generates exactly one spatio-temporal embedding 112 for the sequence of point clouds 102a-n. In some other implementations, the spatio-temporal embedding neural network 110 generates a respective spatio-temporal embedding 112 for each point cloud 102a-n. For example, for each point cloud 102a-n, the spatio-temporal embedding neural network 110 can process the point cloud and each preceding point cloud in the sequence of point clouds 102a-n to generate the respective spatio-temporal embedding 112 for the point cloud. As another example, for each point cloud 102a-n, the spatio-temporal embedding neural network 110 can process the point cloud and an intermediate representation of each preceding point cloud in the sequence of point clouds 102a-n (e.g., an intermediate representation generated by the spatio-temporal embedding neural network 110 when the spatio-temporal embedding neural network 110 generated the spatio-temporal embedding 112 corresponding to the preceding point cloud) to generate the respective spatio-temporal embedding 112 for the point cloud.

In some implementations, the spatio-temporal embedding neural network 110 is configured to receive a sequence of exactly N point clouds 102a-n as input to generate the spatio-temporal embedding 112 of the sequence of point clouds 102a-n. In some other implementations, the spatio-temporal embedding neural network 110 can receive a sequence that includes any number of point clouds 102a-n and generate a spatio-temporal embedding 112 for the sequence.

In some implementations, the spatio-temporal embedding neural network 110 receives each point cloud in the sequence of point clouds 102a-n at the same time, and processes the sequence of point clouds 102a-n to generate the spatio-temporal embedding 112. In some other implementations, the spatio-temporal embedding neural network 110 can receive each point cloud in the sequence of point clouds 102a-n at respective different time points. At each time point that the spatio-temporal embedding neural network 110 receives a point cloud, the spatio-temporal embedding neural network 110 can generate the spatio-temporal embedding 112 for the received point cloud by processing the received point cloud and i) each preceding point cloud received at a preceding time point, ii) an intermediate representation of each preceding point cloud received at a preceding time point (e.g., an intermediate representation generated by the spatio-temporal embedding neural network 110 at the preceding time point when the spatio-temporal embedding neural network 110 generated the spatio-temporal embedding 112 corresponding to the preceding point cloud), or iii) both.

The spatio-temporal embedding neural network 110 can have any appropriate neural network architecture for generating the spatio-temporal embeddings 112. Example spatio-temporal embedding neural networks are discussed in more detail below with respect to FIG. 2, FIG. 3A, and FIG. 3B.

After generating the spatio-temporal embedding 112 of the sequence of point clouds 102a-n, the spatio-temporal embedding neural network 110 can provide the spatio-temporal embedding 112 to M downstream systems 120a-m, where M≥1. Each of the one or more downstream systems 120a-m is configured to process the spatio-temporal embedding 112 to perform a respective downstream task.

For example, the downstream task of one of the downstream systems 120a-m can be object intent prediction, where the downstream system processes the spatio-temporal embedding 112 to generate a prediction of an intended trajectory of one or more objects in the environment represented by the sequence of point clouds 102a-n, e.g., one or more pedestrians or one or more surrounding vehicles.

As another example, the downstream task of one of the downstream systems 120a-m can be object interaction prediction, where the downstream system processes the spatio-temporal embedding 112 to generate a prediction of a future interaction between two or more objects in the environment represented by the sequence of point clouds 102a-n.

As another example, the downstream task of one of the downstream systems 120a-m can be pedestrian action recognition, where the downstream system processes the spatio-temporal embedding 112 to generate a prediction of a respective action of one or more pedestrians in the environment represented by the sequence of point clouds 102a-n.

As another example, the downstream task of one of the downstream systems 120a-m can be pedestrian gesture recognition, where the downstream system processes the spatio-temporal embedding 112 to generate a classification of a respective gesture performed by one or more pedestrians in the environment represented by the sequence of point clouds 102a-n.

As another example, the downstream task of one of the downstream systems 120a-m can be object heatmap prediction, where the downstream system processes the spatio-temporal embedding 112 to generate an image characterizing predicted current locations of one or more objects in the environment represented by the sequence of point clouds 102a-n.

As another example, the downstream task of one of the downstream systems 120a-m can be future trajectory prediction, where the downstream system processes the spatio-temporal embedding 112 to generate a prediction of the future trajectory of one or more objects in the environment represented by the sequence of point clouds 102a-n. For example, the downstream system can process the spatio-temporal embedding 112 to generate a respective predicted heatmap for one or more future time points characterizing a predicted location of one or more objects at the future time points.

As another example, the downstream task of one of the downstream systems 120a-m can be object type classification, where the downstream system processes the spatio-temporal embedding 112 to generate a classification for one or more objects in the environment represented by the sequence of point clouds 102a-n.

In some implementations, one or more of the downstream systems 120a-m can query a respective subset of the spatio-temporal embedding 112 and process only the subset of the spatio-temporal embedding 112 to perform the respective downstream task. For example, the spatio-temporal embedding 112 can include a respective voxel embedding for each voxel in a voxel grid imposed on the environment represented by the sequence of point clouds 102a-n. A downstream system 120a-m can process only the voxel embeddings in the spatio-temporal embedding 112 that are relevant for the respective downstream task. That is, the downstream system might only need the voxel embeddings corresponding to voxels in a particular region of the environment represented by sequence of point clouds 102a-n.

In some implementations, the system 100 can be an on-board system of a vehicle, e.g., an autonomous or semi-autonomous vehicle, operating in the environment represented by the sequence of point clouds 102a-n. For example, each of the point clouds 102a-n can be generated from sensor data captured by one or more sensors on-board the vehicle at respective different time points, e.g., one or more lidar sensors or one or more radar sensors. As a particular example, each time the vehicle generates a new point cloud, the system 100 can provide the new point cloud to the spatio-temporal embedding neural network 100 to generate a new spatio-temporal embedding 112 that encodes information from the new point cloud and each of one or more preceding point clouds generated at preceding time points. The spatio-temporal embeddings 112 can then be used by the M downstream systems 120a-m to make driving decisions for the vehicle.

In some other implementations, the system 100 can be a component of a server system, e.g., a server system that is hosted within a data center, which can be a distributed computing system having hundreds or thousands of computers in one or more locations. For example, the spatio-temporal embedding neural network 110 can generate spatio-temporal embeddings 112 that will be used as training examples for training the M downstream systems 120a-m. As a particular example, a training system can process a spatio-temporal embedding 112 using a downstream system to generate a system output, and the training system can use an error in the system output to update one or more parameters of the downstream system.

In some implementations, the spatio-temporal embedding neural network 110 can be trained concurrently with one or more of the M downstream systems 120a-m. For example, a training system can process a spatio-temporal embedding 112 using a downstream system to generate a system output, and then use an error in the system output to update i) one or more parameters of the downstream system and ii) one or more parameters of the spatio-temporal embedding neural network 110. In this way, the spatio-temporal embedding neural network 110 can be trained to generate spatio-temporal embeddings 112 that include information that is useful to the downstream system.

In some implementations, one or more of the M downstream systems 120a-m can be configured to perform downstream tasks for which the spatio-temporal embedding neural network 110 was not trained. That is, during training, a training system can process the spatio-temporal embeddings 112 generated by the spatio-temporal embedding neural network 110 to perform a first task. Then, during inference (e.g., after the spatio-temporal embedding neural network 110 has been deployed onto an on-board system of a vehicle), the system 100 can process the spatio-temporal embeddings 112 generated by the spatio-temporal embedding neural network 110 to perform a second task that is different than the first task. Thus, the information that the spatio-temporal embedding neural network 110 learned to encode into the spatio-temporal embeddings 112 during training can also be useful for different tasks that were not performed during training.

As a particular example, the training system can train the spatio-temporal embedding neural network 110 on the downstream task of object heatmap prediction, where the downstream system processes the spatio-temporal embedding 112 to generate an image characterizing predicted locations of one or more objects in the environment represented by the sequence of point clouds 102a-n. The training system can determine an error between the generated image and a ground-truth image using per-pixel weighted sigmoid cross-entropy loss. The training system can then backpropagate the error through the downstream system to the spatio-temporal embedding neural network 110.

Figure 2:
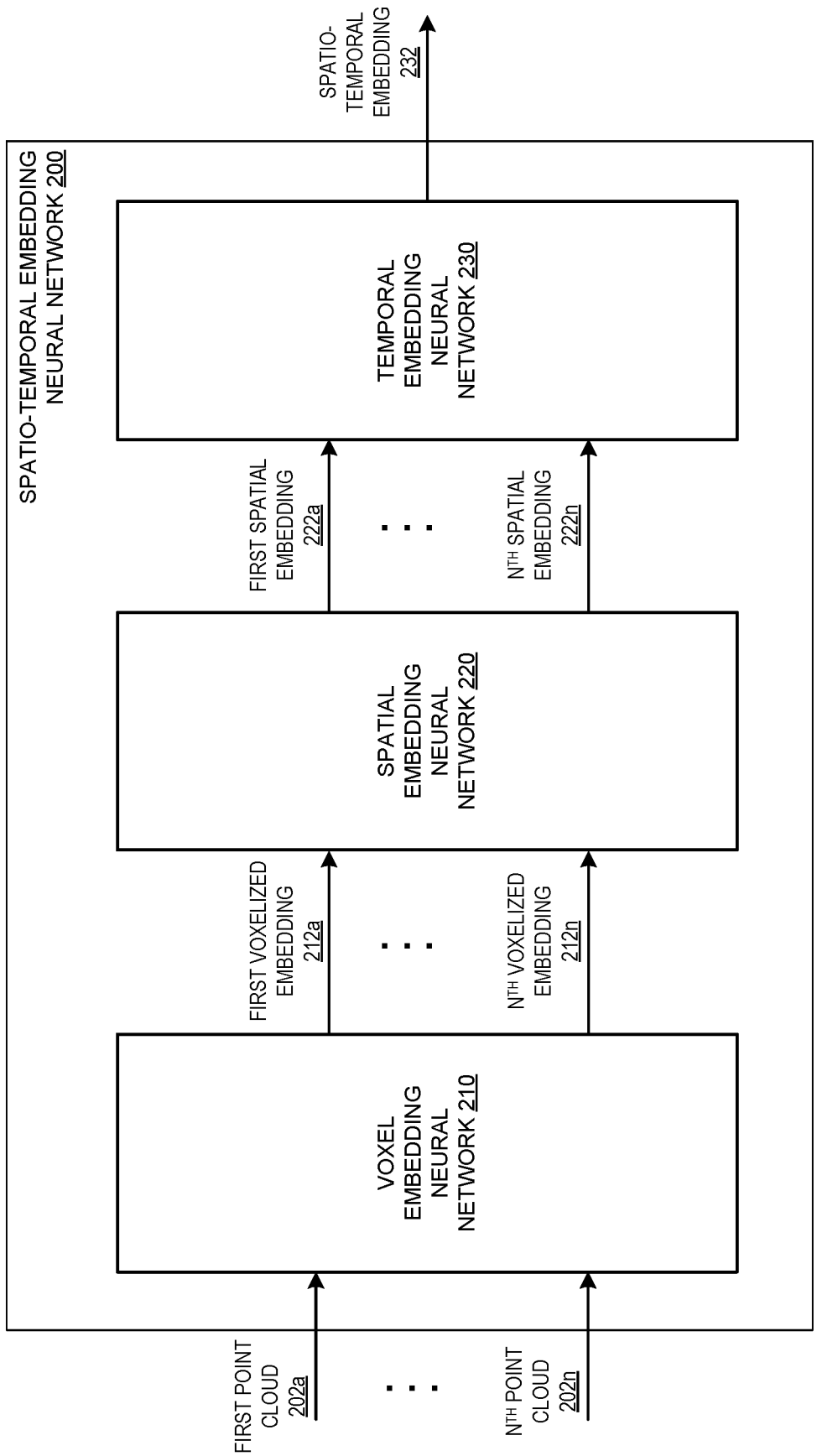
FIGS. 2, 3A, and 3B are diagrams of example spatio-temporal embedding neural networks.
Figure 3A:
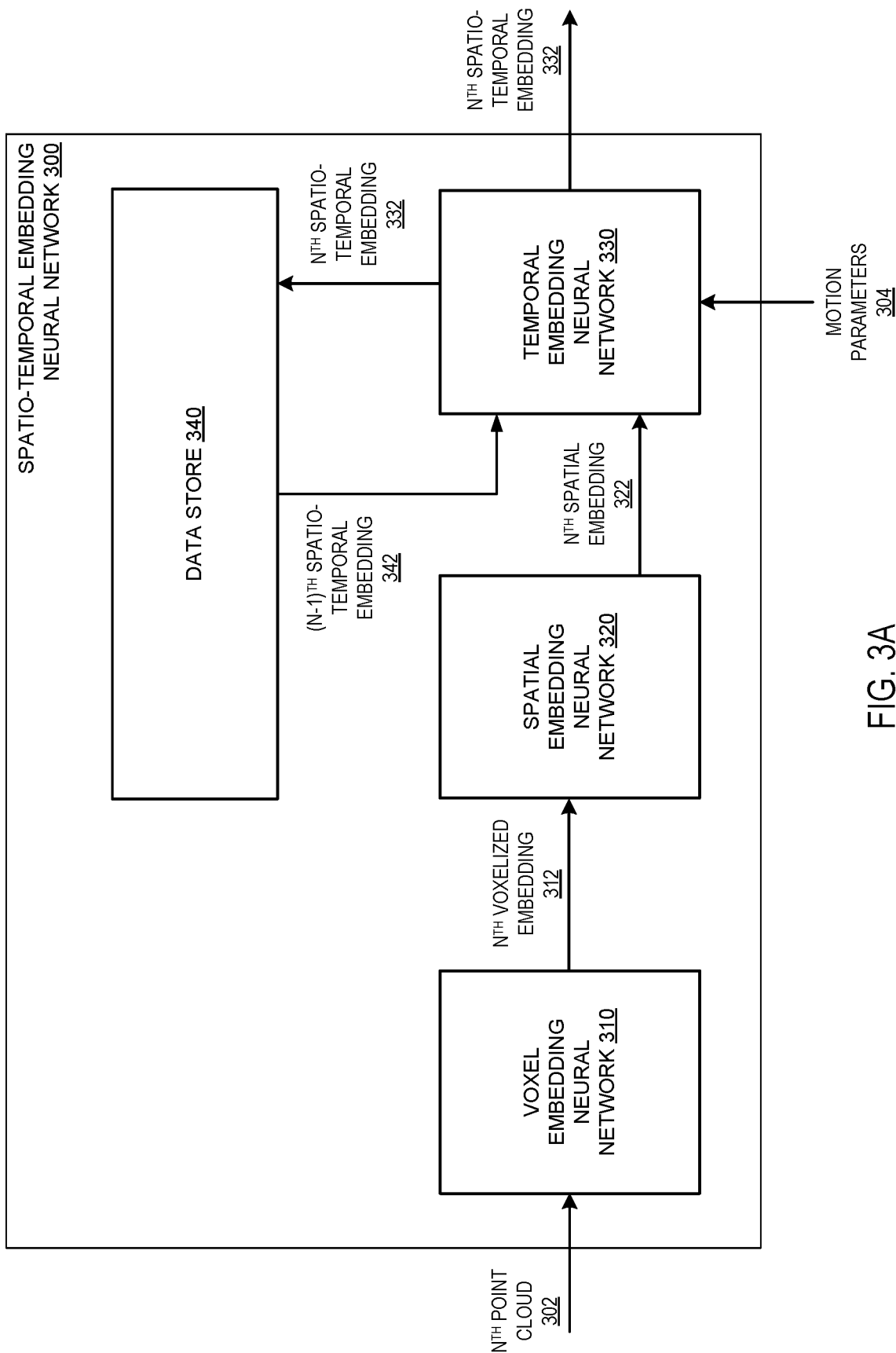
Figure 3B:
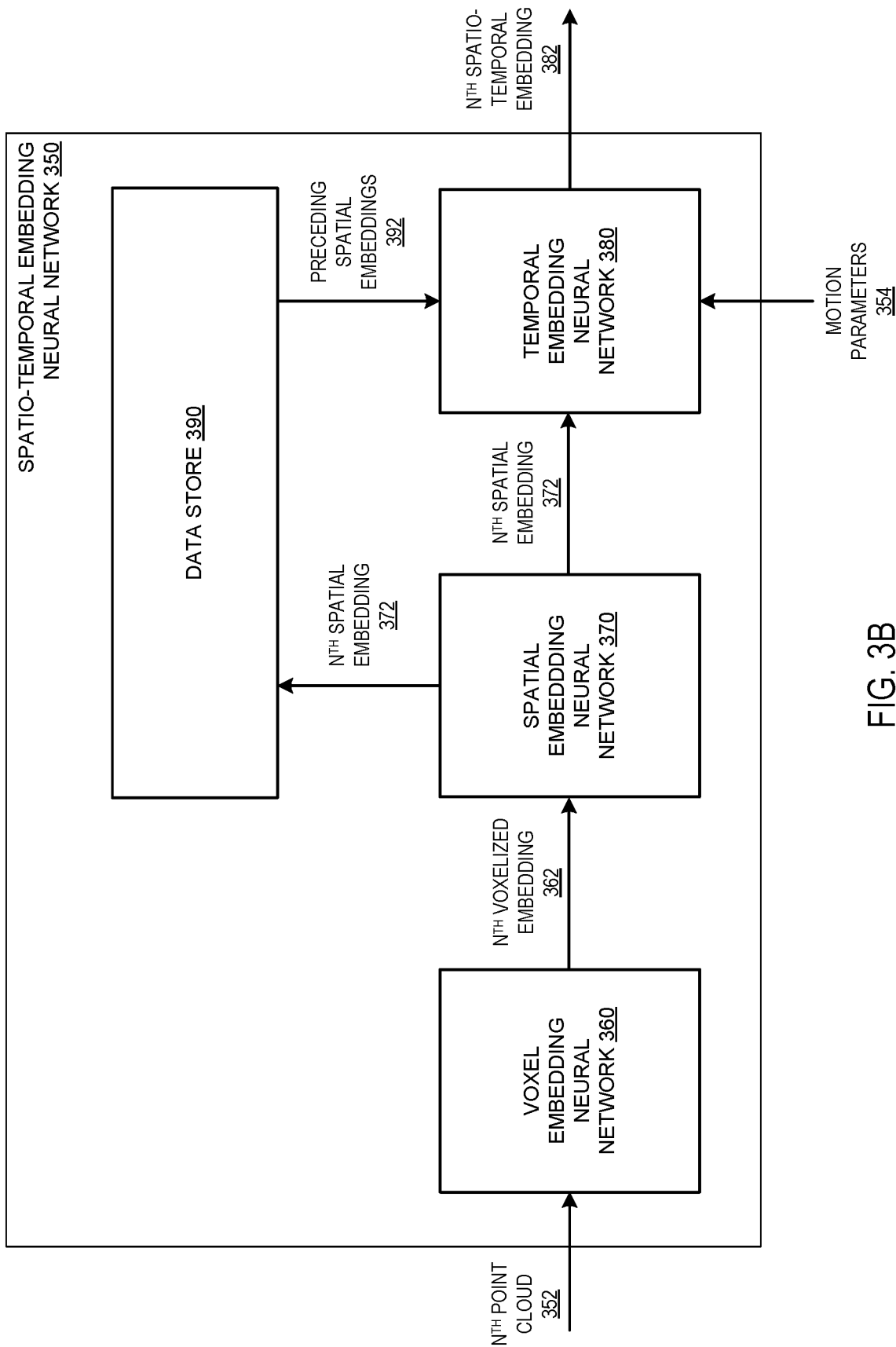

FIG. 2 is a diagram of an example spatio-temporal embedding neural network 200 that receives a sequence of point clouds at the same time and processes the sequence of point clouds to generate a spatio-temporal embedding of the sequence of point clouds. FIGS. 3A and 3B are diagrams of example spatio-temporal embedding neural networks 300 and 350 that receive each point cloud in a sequence of point clouds at a respective different time point and, for each received point cloud, generates a respective spatio-temporal embedding that represents the received point cloud and each preceding point cloud in the sequence of point clouds.

Referring to FIG. 2, the spatio-temporal embedding neural network 200 is an example of a system implemented as computer programs on one or more computers in one or more locations, in which the systems, components, and techniques described below can be implemented.

The spatio-temporal embedding neural network 200 has been configured through training to receive a sequence of point clouds 202a-n and to process the sequence of point clouds 202a-n to generate a spatio-temporal embedding 232 of the sequence of point clouds 202a-n. Each point cloud in the sequence of point clouds 202a-n represents the same environment at a respective different time point.

The spatio-temporal embedding neural network 200 includes three subnetworks: a voxel embedding neural network 210, a spatial embedding neural network 220, and a temporal embedding neural network 230.

For each point cloud 202 in the sequence of point clouds 202a-n, the voxel embedding neural network 210 has been configured through training to receive the point cloud 202 and to generate respective a voxelized embedding 212 for the point cloud 202. The voxelized embedding 212 of a point cloud 202 encodes, for each of multiple voxels of the point cloud 202, information about the points of the point cloud 202 that are in the voxel.

In some implementations, the voxel embedding neural network 210 generates the respective voxel embedding 212 for each point cloud 202 in the sequence of point clouds 202a-n in parallel.

For convenience, the below description will refer to the voxel embedding neural network 210 processing a single point cloud 202; it is to be understood that the voxel embedding neural network 210 can perform the techniques described below for each point cloud 202 in the sequence of point clouds 202a-n.

The voxel embedding neural network 210 can divide the environment represented by the point cloud 202 into a voxel grid that includes multiple voxels, where each voxel represents a volume of space in the environment. The voxel grid can be predetermined; that is, each voxel in the voxel grid can have a predetermine shape and size. For example, the voxel grid can be a Cartesian grid of the environment, where each voxel in the voxel grid represents a cubic or cuboid voxels volume of space in the environment.

The voxel embedding neural network 210 can assign each point in the point cloud 202 to the voxel that the point is in. The voxel embedding neural network 210 can then process the point cloud 202a-n to generate the respective voxelized embedding 212 for the point cloud 202. The voxelized embedding 212 of the point cloud 202 can include a respective voxel embedding for each voxel in the voxel grid of the point cloud 202. The voxel embedding of a respective voxel encodes information from each point assigned to the voxel.

The voxel embedding neural network 210 can have any appropriate network architecture to generate the voxelized embedding 212 of the point cloud 202.

For example, the voxel embedding neural network 210 can process each point in the point cloud 202 using one or more neural network layers, e.g., one or more fully-connected neural network layers, to generate a respective point embedding of the point. For each voxel in the voxel grid, the voxel embedding neural network 210 can combine the respective point embedding of each point assigned to the voxel to generate the voxel embedding for the voxel. For example, for each voxel in the voxel grid, the voxel embedding neural network 210 can process the point embeddings of the points assigned to the voxel using a max-pooling layer to generate an initial voxel embedding. The voxel embedding neural network 210 can then process each initial voxel embedding in the voxel grid using one or more convolutional neural network layers to generate the respective voxel embeddings.

As another example, the voxel embedding neural network 210 can generate multiple different voxel grids corresponding to respective different points of view, and generate respective view-dependent voxelized embeddings for each generated voxel grid. The voxel embedding neural network 210 can then combine the multiple view-dependent voxelized embeddings to generate the voxelized embedding 212a-n of the point cloud 202a-n. In these implementations, the voxelized embedding 212a-n can include a respective voxel embedding for each voxel in a particular voxel grid of the multiple different voxel grids. An example voxel embedding neural network is discussed in more detail below with respect to FIG. 4.

For each point cloud 202 in the sequence of point clouds 202a-n, the spatial embedding neural network 220 has been configured through training to receive the voxelized embedding 212 of the point cloud 202 and to process the voxelized embedding 212 to generate a respective spatial embedding 222 of the point cloud 202. The spatial embedding 222 of a point cloud 202 encodes spatial information of the environment represented by the point cloud 202 at the time the sensor data that was used to generate the point cloud 202 was captured.

In some implementations, the spatial embedding neural network 220 generates the respective spatial embedding 222 for each point cloud 202 in the sequence of point clouds 202a-n in parallel.

In some implementations, the spatial embedding 222 includes a respective spatial embedding for each voxel represented by the voxelized embedding 212 of the point cloud 202.

The spatial embedding neural network 220 can have any appropriate architecture to generate the spatial embeddings 222a-n of the point clouds 202a-n.

For example, the spatial embedding neural network 220 can be a convolutional neural network that performs spatial convolutions on the voxel embeddings of the voxels in a voxelized embedding 2121 to generate a respective spatial embedding 222 for the corresponding point cloud 202. That is, the spatial embedding neural network 220 can process the voxel embeddings of the voxels by convolving one or more learned convolutional filters on the voxel grid.

As a particular example, the spatial embedding neural network 220 can include one or more inception modules. An inception module receives a module input and separately processes the module input using multiple different stacks of one or more convolutional neural network layers. The inception module can then combine the respective outputs of the multiple stacks of convolutional neural network layers, e.g., using concatenation, to generate a module output for the inception module.

For example, each stack of convolutional neural network layers of an inception module can process the module input using a convolutional filter of a different size, e.g., (1×1), (3×3), and (5×5) convolutional filters. In some implementations, one or more stacks of convolutional neural network layers can factorize a respective N×N convolutional filter into a first 1×N filter and a second N×1 filter.

In some implementations, one or more of the inception modules of the spatial embedding neural network 220 also include a max-pooling layer. In some such implementations, the max-pooling layer can be following by one or more convolutional neural network layers. As described above, an inception module can combine the output of the max-pooling layer (or the following convolutional neural network layers) with the outputs of the multiple stacks of convolutional neural network layers, e.g., using concatenation.

As another particular, the spatial embedding neural network 220 can include one or more ResNet blocks. A ResNet block is a block of multiple neural network layers, e.g., convolutional neural network layers, that includes one or more skip connections between respective neural network layers.

In some implementations, the spatio-temporal embedding neural network 200 does not include a voxel embedding neural network 210, and the spatio-temporal embedding neural network 200 provides the sequence of point clouds 202a-n directly to the spatial embedding neural network 220. That is, the spatial embedding neural network 220 can be configured to process the point clouds 202a-n directly to generate the respective spatial embeddings 222a-n.

The temporal embedding neural network 230 has been configured through training to receive the spatial embeddings 222a-n of the point clouds 202a-n and to process the spatial embeddings 222a-n to generate the spatio-temporal embedding 232. The spatio-temporal embedding 232 encodes temporal information from the sequence of spatial embeddings 222a-n, as well as spatial information from each of the spatial embeddings 222a-n.

In some implementations, the spatio-temporal embedding 232 includes a respective spatio-temporal embedding for each voxel represented by the voxelized embedding 212 of the point cloud 202.

The temporal embedding neural network 230 can have any appropriate architecture to generate the spatio-temporal embedding 232 of the point clouds 202a-n.

For example, the temporal embedding neural network 230 can process the sequence of spatial embeddings 222a-n using a convolutional neural network. As a particular example, the temporal embedding neural network 230 can include one or more one-dimensional convolutional neural network layers that process the sequence of spatial embeddings 222a-n along the time dimension.

As another example, the temporal embedding neural network 230 can process the sequence of spatial embeddings 222a-n using a recurrent neural network. The recurrent neural network can process each spatial embedding 222a-n in sequence, and the output of the recurrent neural network after the processing the final spatial embedding 222n corresponding to the final point cloud 202n can be the spatio-temporal embedding 232 of the sequence of point clouds 202a-n.

As a particular example, at a first processing time point in a sequence of N processing time points, the recurrent neural network can process the first spatial embedding 222a corresponding to the first point cloud 202a. Then, at each subsequent processing time point i in the sequence of N processing time points, the recurrent neural network can process i) the $i^{th}$ spatial embedding $222i$ corresponding to the $i^{th}$ point cloud $202i$ and ii) the output of the recurrent neural network at processing time point i−1 and/or an intermediate output generated by the recurrent neural network at processing time point i−1 (e.g., the output of one or more hidden layers of the recurrent neural network that are not the output layer of the recurrent neural network). The output of the recurrent neural network at the final processing time point N can be the spatio-temporal embedding 232.

As another example, the temporal embedding neural network 230 can process the sequence of spatial embeddings 222a-n using an attention-based neural network. As a particular example, the temporal embedding neural network 230 can include a Transformer-based neural network that includes one or more self-attention neural network layers.

After generating the spatio-temporal embedding 232 of the sequence of point clouds 202a-n, the spatio-temporal embedding neural network 200 can provide the spatio-temporal embedding 232 to one or more downstream systems, e.g., one or more downstream systems described above with reference to FIG. 2.

Referring to FIG. 3A, the spatio-temporal embedding neural network 300 is an example of a system implemented as computer programs on one or more computers in one or more locations, in which the systems, components, and techniques described below can be implemented.

The spatio-temporal embedding neural network 300 has been configured through training to receive, at each of a sequence of time points, a new point cloud 302 and to process the point cloud 302 to generate a spatio-temporal embedding 332 that encodes information from the point cloud 302 and each preceding point cloud received at respective preceding time points.

For example, if the spatio-temporal embedding neural network 300 is deployed on-board a vehicle and the point clouds are generated from sensor data captured by one or more sensors on-board the vehicle, then the spatio-temporal embedding neural network 300 can receive each new point cloud 302 at the time that the point cloud 302 is generated from the sensor data.

The spatio-temporal embedding neural network 300 includes three subnetworks: a voxel embedding neural network 310, a spatial embedding neural network 320, and a temporal embedding neural network 330. The spatio-temporal embedding neural network 300 also includes a data store 340.

For each point cloud 302 received by the spatio-temporal embedding neural network 300, the voxel embedding neural network 310 has been configured through training to receive the point cloud 302 and to generate respective a voxelized embedding 312 for the point cloud 302. The voxel embedding neural network 310 can have any appropriate network architecture, e.g., a network architecture described above with respect to FIG. 2.

For each point cloud 302 received by the spatio-temporal embedding neural network 300, the spatial embedding neural network 320 has been configured through training to receive the voxelized embedding 312 of the point cloud 302 and to process the voxelized embedding 312 to generate a respective spatial embedding 322 of the point cloud 302. The spatial embedding neural network 320 can have any appropriate architecture, e.g., a network architecture described above with respect to FIG. 2.

In some implementations, the spatio-temporal embedding neural network 300 does not include a voxel embedding neural network 310, and instead provides the sequence of point clouds 302a-n directly to the spatial embedding neural network 320.

The temporal embedding neural network 330 has been configured through training to receive the spatial embedding 322 of the new point cloud 302 and to process the spatial embedding 322 of the new point cloud 302 to generate the spatio-temporal embedding 332 that represents the new point cloud and the preceding point clouds received by the spatio-temporal embedding neural network 300 at preceding time points. The temporal embedding neural network 330 can have any appropriate network architecture, e.g., a network architecture described above with respect to FIG. 2.

The data store 340 is configured to store the preceding spatio-temporal embedding 342 that was generated by the temporal embedding neural network 330 at the preceding time point. The preceding spatio-temporal embedding 342 corresponds to the preceding point cloud received at the preceding time point, and encodes information from the preceding point cloud and each other point clouds received at respective preceding time points.

When generating the new spatio-temporal embedding 332 for a new point cloud 302, the temporal embedding neural network 330 can retrieve the preceding spatio-temporal embedding 342 from the data store 340 and process the preceding spatio-temporal embedding 342 to generate the new spatio-temporal embedding 332.

Instead of, or in addition to, storing the preceding spatio-temporal embedding 342, the data store 340 can store an intermediate output generated at the preceding time point by the temporal embedding neural network 330 when the temporal embedding neural network 330 was generating the preceding spatio-temporal embedding 342. For example, the intermediate output can include the respective output of one or more hidden layers of the temporal embedding neural network 330 (e.g., the cell state of an LSTM network). The temporal embedding neural network 330 can then retrieve the intermediate output generated at the previous time point when generating the new spatio-temporal embedding 332 for a new point cloud 302.

As a particular example, the temporal embedding neural network 330 can include a recurrent neural network, e.g., an LSTM network, that processes i) the new spatial embedding 322 of the new point cloud 302 and ii) the preceding spatio-temporal embedding 342 and/or the intermediate output generated at the preceding time point.

In some implementations, one or more sensors that capture the sensor data to generate the point clouds 302 can move through the environment represented by the point clouds 302. For example, if the spatio-temporal neural network 300 is deployed on-board a vehicle and the point clouds represent the environment in which the vehicle is operating, then the vehicle can be moving through the environment as respective point clouds are generated.

In some such implementations, the spatio-temporal embedding neural network 300 also receives as input, at each time point, a set of motion parameters 304. The motion parameters 304 can describe the position in the environment represented by the new point cloud 302 of the vehicle. Instead or in addition, the motion parameters 304 can describe motion through the environment represented by the new point cloud 302 of the vehicle. As a particular example, the motion parameters 302 can include one or more of: a location of the vehicle, a heading of the vehicle, a velocity of the vehicle, an acceleration of the vehicle, or a jerk of the vehicle.

The temporal embedding neural network 330 can receive the motion parameters 304 and process the motion parameters 304, along with the new spatial embedding 322 and the preceding spatio-temporal embedding 342 (and/or the intermediate output generated at the preceding time point), to generate the spatio-temporal embedding 332. For example, the temporal embedding neural network 330 can concatenate the motion parameters 304 to the new spatial embedding 322 to generate a concatenated representation, and then process the concatenated representation as input. The preceding spatio-temporal embedding 342 (and/or the intermediate output generated at the preceding time point) can encode the respective motion parameters from each preceding time point, and so the temporal embedding neural network 330 can have access to the motion parameters of the current time point and all preceding time points when generating the new spatio-temporal embedding 332.

Using the motion parameters of the vehicle at the time the new point cloud was generated can encode ego motion into the spatio-temporal embedding 332. Because the vehicle might be moving through the environment, without incorporating ego motion, the spatio-temporal embedding 332 can be inaccurate because the locations of objects in the environment, relative to the vehicle, are changing as the vehicle moves. To overcome this problem without incorporating ego motion, the spatio-temporal embedding neural network 300 can re-calculate, with respect to the new position of the vehicle in the environment, the respective spatial embedding 322 for each preceding point cloud received at respective preceding time points. The temporal embedding neural network 330 can then process each re-calculated preceding spatial embeddings and the new spatial embedding 322 to generate the spatio-temporal embedding 332, e.g., using the recurrent neural network described above. However, re-calculating each spatial embedding at each time point might be prohibitively expensive in terms of time and/or computation. Incorporating ego motion using the motion parameters 304 can be a significantly more efficient way to generate accurate spatio-temporal embeddings 332.

After generating the spatio-temporal embedding 332 corresponding to the new point cloud 302, the spatio-temporal embedding neural network 300 can provide the spatio-temporal embedding 332 to one or more downstream systems. The spatio-temporal embedding neural network 300 can also provide the new spatio-temporal embedding 332 to the data store 340, to be used at the subsequent time point when the spatio-temporal embedding neural network 300 receives a subsequent point cloud.

Referring to FIG. 3B the spatio-temporal embedding neural network 350 is an example of a system implemented as computer programs on one or more computers in one or more locations, in which the systems, components, and techniques described below can be implemented.

The spatio-temporal embedding neural network 350 has been configured through training to receive, at each of a sequence of time points, a new point cloud 352 and to process the point cloud 352 to generate a spatio-temporal embedding 382 that encodes information from the point cloud 352 and each preceding point cloud received at respective preceding time points.

The spatio-temporal embedding neural network 350 includes three subnetworks: a voxel embedding neural network 360, a spatial embedding neural network 370, and a temporal embedding neural network 380. The spatio-temporal embedding neural network 300 also includes a data store 390.

For each point cloud 352 received by the spatio-temporal embedding neural network 350, the voxel embedding neural network 360 has been configured through training to receive the point cloud 352 and to generate respective a voxelized embedding 362 for the point cloud 352. The voxel embedding neural network 360 can have any appropriate network architecture, e.g., a network architecture described above with respect to FIG. 2.

For each point cloud 352 received by the spatio-temporal embedding neural network 350, the spatial embedding neural network 370 has been configured through training to receive the voxelized embedding 362 of the point cloud 352 and to process the voxelized embedding 362 to generate a respective spatial embedding 372 of the point cloud 352. The spatial embedding neural network 370 can have any appropriate architecture, e.g., a network architecture described above with respect to FIG. 2.

In some implementations, the spatio-temporal embedding neural network 350 does not include a voxel embedding neural network 360, and instead provides the sequence of point clouds 352a-n directly to the spatial embedding neural network 370.

The temporal embedding neural network 380 has been configured through training to receive the spatial embedding 372 of the new point cloud 352 and to process the spatial embedding 372 of the new point cloud 352 to generate the spatio-temporal embedding 382 that represents the new point cloud and the preceding point clouds received by the spatio-temporal embedding neural network 350 at preceding time points. The temporal embedding neural network 380 can have any appropriate network architecture, e.g., a network architecture described above with respect to FIG. 2.

The data store 390 is configured to store preceding spatial embeddings 392 that were generated by the spatial embedding neural network 370 at respective preceding time points. The preceding spatial embeddings 392 correspond to respective preceding point cloud received at respective preceding time points. For example the data store 390 can store P preceding spatial embeddings 392 corresponding to the P preceding time points at which the spatio-temporal embedding neural network 350 received point clouds, P≥1.

When generating the new spatio-temporal embedding 382 for a new point cloud 352, the temporal embedding neural network 380 can retrieve the P preceding spatial embeddings 392 from the data store 390 and process the preceding spatial embeddings 392 to generate the new spatio-temporal embedding 382.

As a particular example, the temporal embedding neural network 380 can include a convolutional neural network that processes i) the preceding spatial embeddings 392 corresponding to respective preceding point clouds and ii) the new spatial embedding 372 corresponding to the new point cloud 352 using one-dimensional convolution along the time dimension.

As described above with respect to FIG. 3A, in some implementations, one or more sensors that capture the sensor data to generate the point clouds 352 can move through the environment represented by the point clouds 352, e.g., if the spatio-temporal neural network 300 is deployed on-board a vehicle.

In some such implementations, the spatio-temporal embedding neural network 350 also receives as input, at each time point, a set of motion parameters 354. The motion parameters 354 can describe the position and/or motion of the vehicle in the environment represented by the new point cloud 352.

The temporal embedding neural network 380 can receive the motion parameters 354 and process the motion parameters 354, along with the new spatial embedding 372 and the preceding spatial embeddings 392, to generate the spatio-temporal embedding 382.

In some implementations, the temporal embedding neural network 380 processes the new spatial embedding 372 according to the motion parameters 354 to center the coordinate system of the new spatial embedding 372 at a common center point in the environment. For example, if the spatial embedding 372 includes a respective spatial embedding for each voxel represented by the voxelized embedding 362, then the temporal embedding neural network 380 can translate the spatial embeddings according to i) the current location of the vehicle in the environment identified in the motion parameters 354 and ii) the stationary common center point in the environment. As a particular example, the common center point can be the location of the vehicle in the environment at the first time point corresponding to the first point cloud 352 received by the spatio-temporal embedding neural network 350.

The coordinate system of each preceding spatial embedding 392 can also be centered at the common center point in the environment (e.g., because the temporal embedding neural network 380 centered each of the preceding spatial embeddings 392 using respective motion parameters at the respective preceding time point). Thus, each spatial embedding 372 and 392 can be represented from a common frame of reference.

In some other implementations, the data store 390 stores the respective motion parameters for each preceding time point corresponding to the preceding spatial embeddings 392. Then, to generate the spatio-temporal embedding 382, the temporal embedding neural network 380 can process i) the new spatial embedding 372 and the new motion parameters 352 and ii) the P preceding spatial embeddings 392 and their corresponding P sets of motion parameters.

As described above with respect to FIG. 3A, by incorporating ego motion using the motion parameters 354, the spatio-temporal embedding neural network 350 can avoid re-calculating, at each time point, the respective spatial embedding for each preceding point cloud and then processing the re-calculated preceding spatial embeddings and the new spatial embedding 372 to generate the spatio-temporal embedding 382, e.g., using the convolutional neural network described above.

After generating the spatio-temporal embedding 382 corresponding to the new point cloud 352, the spatio-temporal embedding neural network 350 can provide the spatio-temporal embedding 382 to one or more downstream systems. The spatio-temporal embedding neural network 350 can also provide the new spatial embedding 372 generated by the spatial embedding neural network 370 to the data store 390, to be used at subsequent time points when the spatio-temporal embedding neural network 350 receives subsequent point clouds.

Figure 4:
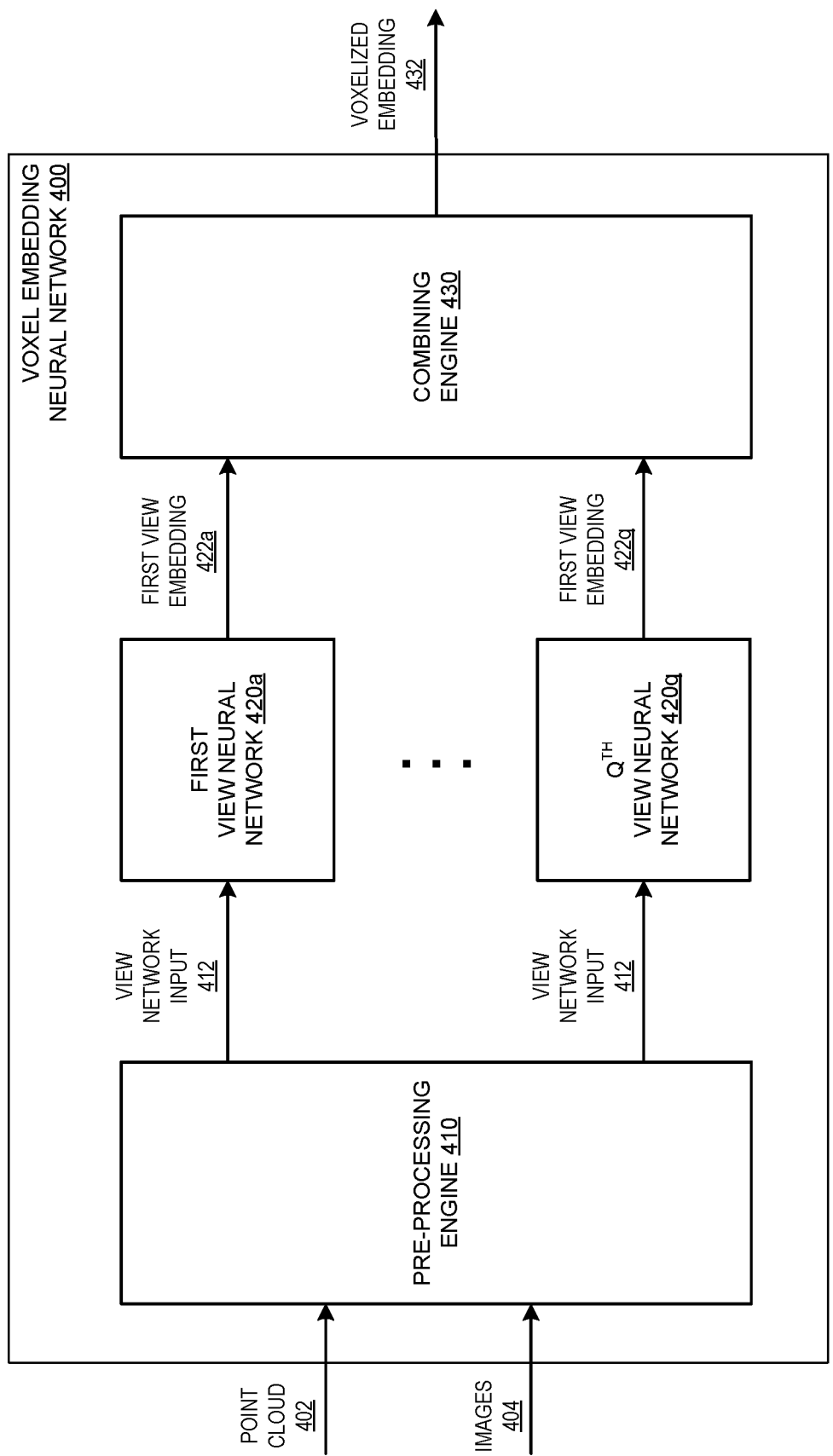
FIG. 4 is a diagram of an example voxel embedding neural network.

FIG. 4 is a diagram of an example voxel embedding neural network 400. The voxel embedding neural network 400 is an example of a system implemented as computer programs on one or more computers in one or more locations, in which the systems, components, and techniques described below can be implemented. The voxel embedding neural network 400 can be a component of a spatio-temporal embedding neural network, e.g., the spatio-temporal embedding neural network 110 depicted in FIG. 1, that is configured to generate a spatio-temporal embedding of a sequence of point clouds.

The voxel embedding neural network 400 has been configured through training to receive a point cloud 402 and to generate a voxelized embedding 432 of the point cloud 402. The point cloud 402 contains K points.

The voxel embedding neural network 400 includes a pre-processing engine 410, Q view neural networks 420$a$-$q$ (Q≥1), and a combining engine 430. In some implementations, each point in the point cloud 402 is defined by three coordinates that represent a location in the environment represented by the point cloud 402. Each point can also have one or more additional features, e.g., an intensity value.

The pre-processing engine 410 is configured to receive the point cloud 402 and to generate a view network input 412.

In some implementations, the pre-processing engine 410 processes each point in the point cloud using one or more neural network layers, e.g., one or more fully-connected layers. The neural network layers can embed each point into a high-dimensional feature space.

In some implementations, the pre-processing engine 410 also obtains one or more images 404 that depict the same environment as the point cloud 402. The pre-processing engine 410 can embed information from the images 404 into the points in the point cloud 402.

For example, the images 404 can be color images, and the pre-processing engine 410 can project a color value (e.g., an RGB value) from the images 404 onto the points in the point cloud 402. That is, the pre-processing engine 410 can determine, for each of one or more points in the point cloud 402, a corresponding pixel in an image 404. The point in the point cloud 402 and the corresponding pixel in the image 404 each depict the same object in the environment represented by the point cloud 402 and the images 404. The pre-processing engine 410 can then assign the color value of the corresponding pixel to the point.

Instead or in addition, the pre-processing engine 410 can process the one or more images 404 using a neural network, e.g., a convolutional neural network, to generate a respective feature map for each image 404. The pre-processing engine 410 can then project the computed features of the feature maps onto the points in the point cloud 402. That is, the pre-processing engine 410 can determine, for each of one or more points in the point cloud 402, a corresponding pixel in the feature maps, and then assign the features of the corresponding pixel to the point.

After generating the view network input 412, the pre-processing engine 410 can provide the view network input 412 to each of the Q view neural networks 420$a$-$q$. That is, each of the Q view neural networks 420$a$-$q$ receives the same input 412. The view network input 412 can be a K×L matrix, where each row of the matrix corresponds to a point of the K points in the point cloud 402 and includes an L-dimensional feature embedding of the point generated by the pre-processing engine 410. In some implementations, L=3, where the view network input 412 includes the respective coordinates of each point in the environment represented by the point cloud 402.

Each view neural network 420$a$-$q$ processes the view network input 412 with respect to a different point of view to generate a respective view embedding 422$a$-$q$. Each view embedding 422$a$-$q$ is an embedding of the view network input 412 with respect to the corresponding point of view into a high-dimensional feature space, where object semantics and shape information can be captured.

For example, a view neural network 420 can process the view network input 412 with respect to a birds-eye point of view, i.e., viewing the environment from above, to generate a view embedding 422 corresponding to the birds-eye point of view. As another example, a view neural network 420 can process the view network input 412 with respect to a perspective point of view, i.e. viewing the environment from the point of view of one or more sensors of a vehicle in the environment, to generate a view embedding 422 corresponding to the perspective point of view.

Each view neural network 420 can first divide the environment represented by the point cloud 402 into a voxel grid that includes multiple voxels, where each voxel represents a volume of space in the environment. Each view neural network 420 divides the environment into voxels according to the corresponding point of view. For example, a perspective view neural network 420 can divide the environment into voxels that extend radially from a vehicle in the environment, while a birds-eye view neural network 420 can divide the environment into a grid of cubic or cuboid voxels as viewed from above the environment. After dividing the environment into voxels, each view neural network 420 can assign each point in the view network input 412 to the voxel that the point is in.

In some implementations, each view neural network 420 can use dynamic voxelization; that is, the view neural networks 420$a$-$q$ do not fix the number of voxels or the number of points per voxel beforehand. Rather, each view neural network 420 can dynamically process all voxels and all pixels per voxel to generate the respective view embedding.

As a particular example, each view neural network 420 can process each point in the view network input 412 to generate a view-dependent point embedding for the point, e.g., by processing each point using one or more fully-connected neural network layers. The view neural network 420 can then aggregate, for each voxel, the respective point embedding of each point in the voxel to generate an initial voxel embedding for the voxel. For example, the view neural network 420 can apply a max-pooling layer to the point embeddings of the points in the voxel. The view neural network 420 can then process the respective initial voxel embeddings for each voxel in the voxel grid to generate the view embedding 422. For example, the view neural network 420 can apply one or more convolutional neural network layers to each initial voxel embedding in the voxel grid.

Each view embedding 422$a$-$q$ can include a respective voxel embedding for each voxel in the voxel grid corresponding to the respective view neural network 420$a$-$q$.

The combining engine 420 can obtain the respective view embeddings 422$a$-$q$ of the view neural networks 420$a$-$q$ and combine the view embeddings 422$a$-$q$ to generate the voxelized embedding 432.

For example, for each point in the point cloud 402, the combining engine 430 can generate a final point embedding for the point by combining, for each view embedding 422a-q, the voxel embedding in the view embedding 422a-q for the voxel to which the point is assigned. As a particular example, the combining engine 430 can generate the final point embedding for the point by concatenating the respective voxel embeddings for the voxels to which the point was assigned in respective view embeddings 422a-q.

The combining engine 430 can then combine the respective final point embedding for each point in the point cloud 402 to generate the voxelized embedding 432.

As a particular example, the combining engine 430 can divide the environment represented by the point cloud 402 into a final voxel grid that includes multiple final voxels. The voxelized embedding 432 can include a respective final voxel embedding for each final voxel in the final voxel grid. In some implementations, the final voxel grid can be the same as the respective voxel grid corresponding to one of the view neural networks 420a-q. For example, the final voxel grid can be a birds-eye voxel grid (also called a Cartesian voxel grid) with cubic or cuboid final voxels.

The combining engine 430 can assign each point in the point cloud 402 to the final voxel in the final voxel grid that the point is in. The combining engine 430 can then combine, for each final voxel, the final point embeddings of the points assigned to the voxel to generate the final voxel embedding for the final voxel. As a particular example, the combining engine 430 can process the final point embeddings using a max-pooling layer to generate the final voxel embedding. After generating the final voxel embedding for each final voxel in the final voxel grid, the combining engine 430 can output the voxelized embedding 432, which includes each final voxel embedding.

The voxel embedding neural network 400 can provide the voxelized embedding 432 to a spatial embedding neural network, e.g., the spatial embedding neural network 220 depicted in FIG. 2, of the spatio-temporal embedding neural network.

Figure 5:
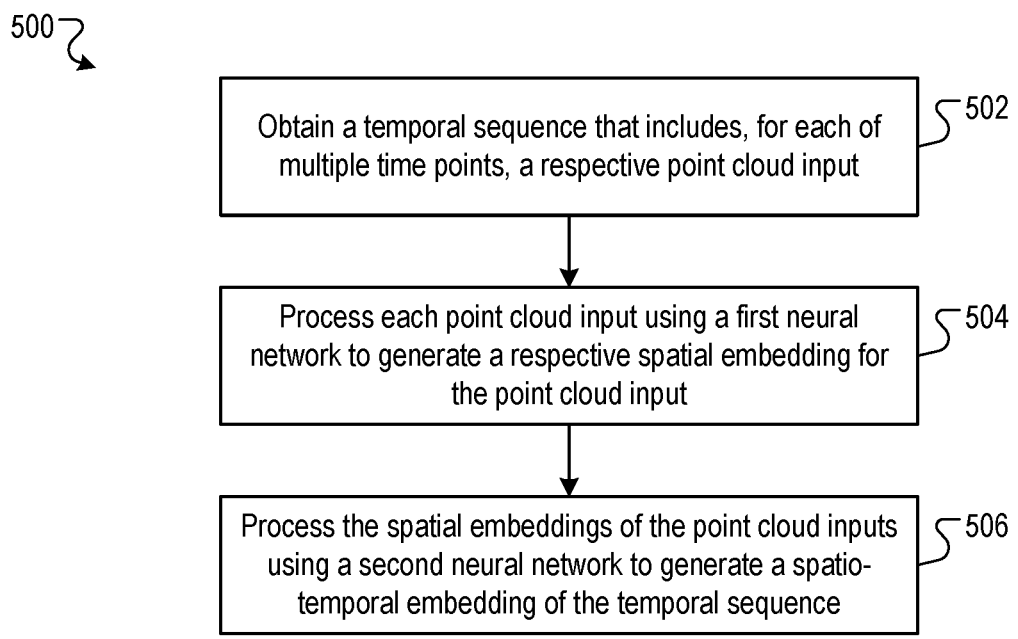
FIG. 5 is a flow diagram of an example process for generating a spatio-temporal embedding of a sequence of point clouds.

FIG. 5 is a flow diagram of an example process for generating a spatio-temporal embedding of a sequence of point clouds. For convenience, the process 500 will be described as being performed by a system of one or more computers located in one or more locations. For example, a system, e.g., the system 100 depicted of FIG. 1, appropriately programmed in accordance with this specification, can perform the process 500.

The system obtains a temporal sequence that includes, for each of multiple time points, a respective point cloud input (step 502). Each point cloud input can include point cloud data generated from sensor data captured by one or more sensors of a vehicle at the respective time point.

The system processes each point cloud input using a first neural network to generate a respective spatial embedding for the point cloud input that characterizes the point cloud input (step 504).

The system processes the spatial embeddings of the point cloud inputs using a second neural network to generate a spatio-temporal embedding that characterizes the point cloud inputs in the temporal sequence (step 506).

After generating the spatio-temporal embedding, the system can provide the spatio-temporal embedding to each of multiple task-specific downstream neural networks. Each task-specific neural network can be configured to process the spatio-temporal embedding to generate a prediction output for a different prediction task.

In some implementations, the first neural network and the second neural network can be trained jointly on a particular prediction task. In some such implementations, the particular prediction task is not one of the prediction tasks corresponding to the task-specific downstream neural networks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining a temporal sequence comprising a respective point cloud input corresponding to each of a plurality of time points, each point cloud input comprising point cloud data generated from sensor data captured by one or more sensors of a vehicle at the respective time point;

processing each point cloud input using a first neural network to generate a respective spatial embedding that characterizes the point cloud input; and processing the spatial embeddings of the point cloud inputs using a second neural network to generate a spatio-temporal embedding that characterizes the point cloud inputs in the temporal sequence.

Embodiment 2 is the method of embodiment 1, further comprising:

processing the spatio-temporal embedding using each of a plurality of task-specific neural networks, wherein each task-specific neural network is configured to process the spatio-temporal embedding to generate a predicted output for a different prediction task.

Embodiment 3 is the method of embodiment 2, wherein the first neural network and the second neural network have been trained jointly on a first prediction task, and wherein the first prediction task is not one of the different prediction tasks corresponding to the plurality of task-specific neural networks.

Embodiment 4 is the method of any one of embodiments 1-3, wherein processing each point cloud input comprises:
dividing the point cloud data into a plurality of voxels,
generating a feature representation that includes features for each voxel, and
processing the feature representation using the first neural network to generate the spatial embedding.

Embodiment 5 is the method of embodiment 4, wherein generating a feature representation comprises:
processing the point cloud data using one or more view neural networks, wherein a view neural network extracts features from the point cloud data with respect to a certain point of view; and
combining the outputs of the one or more view neural networks to generate the feature representation.

Embodiment 6 is the method of embodiment 5, wherein the one or more view neural networks includes a birds-eye view neural network that extracts features with respect to a birds-eye view and a perspective view neural network that extracts features with respect to a perspective view.

Embodiment 7 is the method of any one of embodiments 5 or 6, wherein processing the point cloud data using one or more view neural networks comprises processing each point in the point cloud data with a fully-connected layer that is shared by the one or more view neural networks to embed the points in a high-dimensional feature space.

Embodiment 8 is the method of any one of embodiments 5-7, wherein combining the outputs of the one or more view neural networks comprises concatenating the outputs of the one or more view neural networks.

Embodiment 9 is the method of any one of embodiments 1-8, wherein processing the spatial embeddings using the second neural network comprises processing the spatial embeddings with a one-dimensional convolutional neural network layer.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a temporal sequence comprising a respective point cloud input corresponding to each of a plurality of time points, each point cloud input comprising point cloud data generated from sensor data captured by one or more sensors of a vehicle at the respective time point;
processing each point cloud input using a first neural network to generate a respective spatial embedding that characterizes the point cloud input, comprising, for each point cloud input:
dividing the point cloud data into a plurality of voxels,
generating a feature representation that includes features for each voxel, and
processing the feature representation using the first neural network to generate the spatial embedding;
processing the spatial embeddings of the point cloud inputs using a second neural network to generate a spatio-temporal embedding that characterizes the point cloud inputs in the temporal sequence; and
processing the spatio-temporal embedding that characterizes the point cloud inputs in the temporal sequence using a task-specific neural network, wherein the task-specific neural network is configured to process the spatio-temporal embedding to generate a predicted output for a prediction task.

2. The method of claim 1, further comprising:
processing the spatio-temporal embedding using one or more additional task-specific neural networks, wherein each additional task-specific neural network is configured to generate a respective predicted output for a corresponding additional prediction task that is different from the prediction task.

3. The method of claim 1, wherein the first neural network and the second neural network have been trained jointly on a first prediction task, and wherein the first prediction task is not the same as the prediction task.

4. The method of claim 1, wherein generating a feature representation comprises:
processing the point cloud data using one or more view neural networks, wherein a view neural network extracts features from the point cloud data with respect to a certain point of view; and combining the outputs of the one or more view neural networks to generate the feature representation.

5. The method of claim 4, wherein the one or more view neural networks includes a birds-eye view neural network that extracts features with respect to a birds-eye view and a perspective view neural network that extracts features with respect to a perspective view.

6. The method of claim 4, wherein processing the point cloud data using one or more view neural networks comprises processing each point in the point cloud data with a fully-connected layer that is shared by the one or more view neural networks to embed the points in a high-dimensional feature space.

7. The method of claim 4, wherein combining the outputs of the one or more view neural networks comprises concatenating the outputs of the one or more view neural networks.

8. The method of claim 1, wherein processing the spatial embeddings using the second neural network comprises processing the spatial embeddings with a one-dimensional convolutional neural network layer.

9. A system comprising one or more computers and one or more storage devices storing instructions that are operable, when executed by the one or more computers, to cause the one or more computers to perform operations comprising:
   obtaining a temporal sequence comprising a respective point cloud input corresponding to each of a plurality of time points, each point cloud input comprising point cloud data generated from sensor data captured by one or more sensors of a vehicle at the respective time point;
   processing each point cloud input using a first neural network to generate a respective spatial embedding that characterizes the point cloud input, comprising, for each point cloud input:
      dividing the point cloud data into a plurality of voxels,
      generating a feature representation that includes features for each voxel, and
      processing the feature representation using the first neural network to generate the spatial embedding;
   processing the spatial embeddings of the point cloud inputs using a second neural network to generate a spatio-temporal embedding that characterizes the point cloud inputs in the temporal sequence; and
   processing the spatio-temporal embedding that characterizes the point cloud inputs using a task-specific neural network, wherein the task-specific neural network is configured to process the spatio-temporal embedding to generate a predicted output for a prediction task.

10. The system of claim 9, wherein the operations further comprise:
   processing the spatio-temporal embedding using one or more additional task-specific neural networks, wherein each additional task-specific neural network is configured to generate a respective predicted output for a corresponding prediction task that is different from the prediction task.

11. The system of claim 9, wherein the first neural network and the second neural network have been trained jointly on a first prediction task, and wherein the first prediction task is not one of the different prediction tasks corresponding to the plurality of task-specific neural networks.

12. The system of claim 9, wherein generating feature representation comprises:
   processing the point cloud data using one or more view neural networks, wherein a view neural network extracts features from the point cloud data with respect to a certain point of view; and
   combining the outputs of the one or more view neural networks to generate the feature representation.

13. The system of claim 9, wherein processing the spatial embeddings using the second neural network comprises processing the spatial embeddings with a one-dimensional convolutional neural network layer.

14. One or more non-transitory computer storage media encoded with computer program instructions that when executed by a plurality of computers cause the plurality of computers to perform operations comprising:
   obtaining a temporal sequence comprising a respective point cloud input corresponding to each of a plurality of time points, each point cloud input comprising point cloud data generated from sensor data captured by one or more sensors of a vehicle at the respective time point;
   processing each point cloud input using a first neural network to generate a respective spatial embedding that characterizes the point cloud input, comprising, for each point cloud input:
      dividing the point cloud data into a plurality of voxels,
      generating a feature representation that includes features for each voxel, and
      processing the feature representation using the first neural network to generate the spatial embedding;
   processing the spatial embeddings of the point cloud inputs using a second neural network to generate a spatio-temporal embedding that characterizes the point cloud inputs in the temporal sequence; and
   processing the spatio-temporal embedding that characterizes the point cloud inputs using a task-specific neural network, wherein the task-specific neural network is configured to process the spatio-temporal embedding to generate a predicted output for a prediction task.

15. The non-transitory computer storage media of claim 14, wherein the operations further comprise:
   processing the spatio-temporal embedding using one or more additional task-specific neural networks, wherein each additional task-specific neural network is configured to generate a respective predicted output for a corresponding additional prediction task that is different from the prediction task.

16. The non-transitory computer storage media of claim 14, wherein the first neural network and the second neural network have been trained jointly on a first prediction task, and wherein the first prediction task is not the same as the prediction task.

17. The non-transitory computer storage media of claim 14, wherein processing the spatial embeddings using the second neural network comprises processing the spatial embeddings with a one-dimensional convolutional neural network layer.

18. The non-transitory computer storage media of claim 14, wherein generating a feature representation comprises:
   processing the point cloud data using one or more view neural networks, wherein a view neural network extracts features from the point cloud data with respect to a certain point of view; and
   combining the outputs of the one or more view neural networks to generate the feature representation.

19. The non-transitory computer storage media of claim 18, wherein the one or more view neural networks includes a birds-eye view neural network that extracts features with respect to a birds-eye view and a perspective view neural network that extracts features with respect to a perspective view.

20. The non-transitory computer storage media of claim 18, wherein processing the point cloud data using one or more view neural networks comprises processing each point in the point cloud data with a fully-connected layer that is shared by the one or more view neural networks to embed the points in a high-dimensional feature space.

* * * * *